US007697923B2

(12) United States Patent
Eronen

(10) Patent No.: US 7,697,923 B2
(45) Date of Patent: Apr. 13, 2010

(54) SYSTEM AND METHOD FOR PROVIDING AN AUTOMATIC GENERATION OF USER THEME VIDEOS FOR RING TONES AND TRANSMITTAL OF CONTEXT INFORMATION

(75) Inventor: Antti Eronen, Tampere (FI)

(73) Assignee: Nokia Corporation, Espoo (FI)

( * ) Notice: Subject to any disclaimer, the term of this patent is extended or adjusted under 35 U.S.C. 154(b) by 736 days.

(21) Appl. No.: 11/127,706

(22) Filed: May 12, 2005

(65) Prior Publication Data

US 2006/0258340 A1    Nov. 16, 2006

(51) Int. Cl.
*H04M 3/42* (2006.01)

(52) U.S. Cl. ............... 455/414.1; 455/415; 455/551; 455/566; 455/567

(58) Field of Classification Search ............ 455/414.1, 455/415, 551, 566, 567
See application file for complete search history.

(56) References Cited

U.S. PATENT DOCUMENTS

| | | | |
|---|---|---|---|
| 6,707,908 B1 | 3/2004 | Nagasawa | |
| 6,757,533 B2 | 6/2004 | Lampela et al. | |
| 6,959,207 B2 * | 10/2005 | Keinonen et al. | 455/567 |
| 2003/0128834 A1 | 7/2003 | Laine | |
| 2003/0139172 A1 | 7/2003 | Lampela et al. | |
| 2004/0121818 A1 | 6/2004 | Paakkonen | |
| 2004/0204146 A1 | 10/2004 | Deeds | |
| 2004/0207722 A1 | 10/2004 | Koyama et al. | |
| 2005/0287997 A1 * | 12/2005 | Fournier | 455/415 |

FOREIGN PATENT DOCUMENTS

EP    1 033 878    9/2000

OTHER PUBLICATIONS

International Search Report for Application PCT/IB2006/001255.
European Search Report for Application EP 06 74 46 98 dated Feb. 2, 2009.
Supplementary European Search Report for EP Application No. 06744698 mailed Feb. 2, 2009.

* cited by examiner

*Primary Examiner*—Joseph H Feild
*Assistant Examiner*—Huy D Nguyen
(74) *Attorney, Agent, or Firm*—Foley & Lardner, LLP

(57) ABSTRACT

A system and method for automatically generating a video specific to a contact for display on a mobile telephone when a call is initiated with the contact. Media files are manually and/or automatically associated with an individual contact, and a video generator module automatically creates a theme video based upon the associated media files. When a call is made to or from the contact, the video is played on the mobile telephone or other electronic device.

22 Claims, 5 Drawing Sheets

SYSTEM AND METHOD FOR PROVIDING AN AUTOMATIC GENERATION OF USER THEME VIDEOS FOR RING TONES AND TRANSMITTAL OF CONTEXT INFORMATION

FIELD OF THE INVENTION

The present invention relates generally to the use of ring tones on devices such as mobile telephones. More particularly, the present invention relates to the association of features such as logos, image data, video data, and other context information with ring tones on mobile telephones and similar devices.

BACKGROUND OF THE INVENTION

In recent years, the number of features that have been incorporated into devices such as mobile telephones has increased exponentially. With increases in memory and processing capabilities in mobile devices, manufactures have been able to greatly increase the number of features on such devices, permitting users to greatly customize their own products.

One such area where users have been provided with increased customizable options involves the multimedia experience associated with initiating and receiving telephone calls. Many mobile telephones indicate the arrival of an incoming call with a customizable ring tone, which can take the form of a MIDI, .wav, MP3 or adaptive audio coding (AAC) music file. Some systems permit a user to change the ring tone for different individuals, providing an indication of who has placed a call. Other systems enable users to literally create their own ring tones. Traditionally, many users have also been able to observe basic information about another party on an actual or attempted telephone call. For example, a user is often able to see the name and telephone number of a person to whom a call is being made or of the person who is initiating such a call.

In recent years, additional pieces of information have started to become available to call initiators and recipients. For example, U.S. Published Patent Application No. 2003/0139172 and U.S. Pat. No. 6,757,533, both of which filed Jan. 23, 2002, assigned to Nokia Corporation and incorporated herein by reference, disclose a system in which multimedia messaging service (MMS) information, including video image data, can be transmitted to a call recipient at the same time that the call is being placed, simultaneously providing the recipient both with the phone call and video information. Similarly, a system can also send graphical information, such as group logos or an image of the sender, to a recipient device in conjunction with a phone call being placed by the sender.

Another feature that has become available on electronic devices in recent years includes the ability for a device to automatically create custom videos. One such application incorporating this feature is entitled the "Movie Director" and is included on mobile telephones sold by the Nokia Corporation. The Movie Director is capable of automatically generating music videos from a user's own video clips and music files. The Movie Director automatically cuts video clips in appropriate locations, adds effects to the audio being used, and adds graphics in order to enhance the visual appearance of the new "video." However, this product currently is "stand alone" in nature and is not related to the placing or receipt of telephone calls.

SUMMARY OF THE INVENTION

The present invention comprises a system and method for providing telephone call participants with an enhanced user experience by automatically creating or generating a series of multimedia objects which are played during the initiation of and during a telephone call. The present invention gathers and edits previously stored media items that relate to a call participant, providing the user with additional information with regard to the other call participant. The multimedia composition can be continuously updated as new information becomes available and can be customizable by the user.

With the present invention, the information presented to a user is much more personal than is the case with simple customizable ring tones, and much more information is provided than simply a person's name a telephone number. The continuous generation of new multimedia depictions also creates an element of surprise to the user. Furthermore, the present invention results in the provision of a very rudimentary videoconference capability, as users are provided with video information and context in conjunction with the actual audio call.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
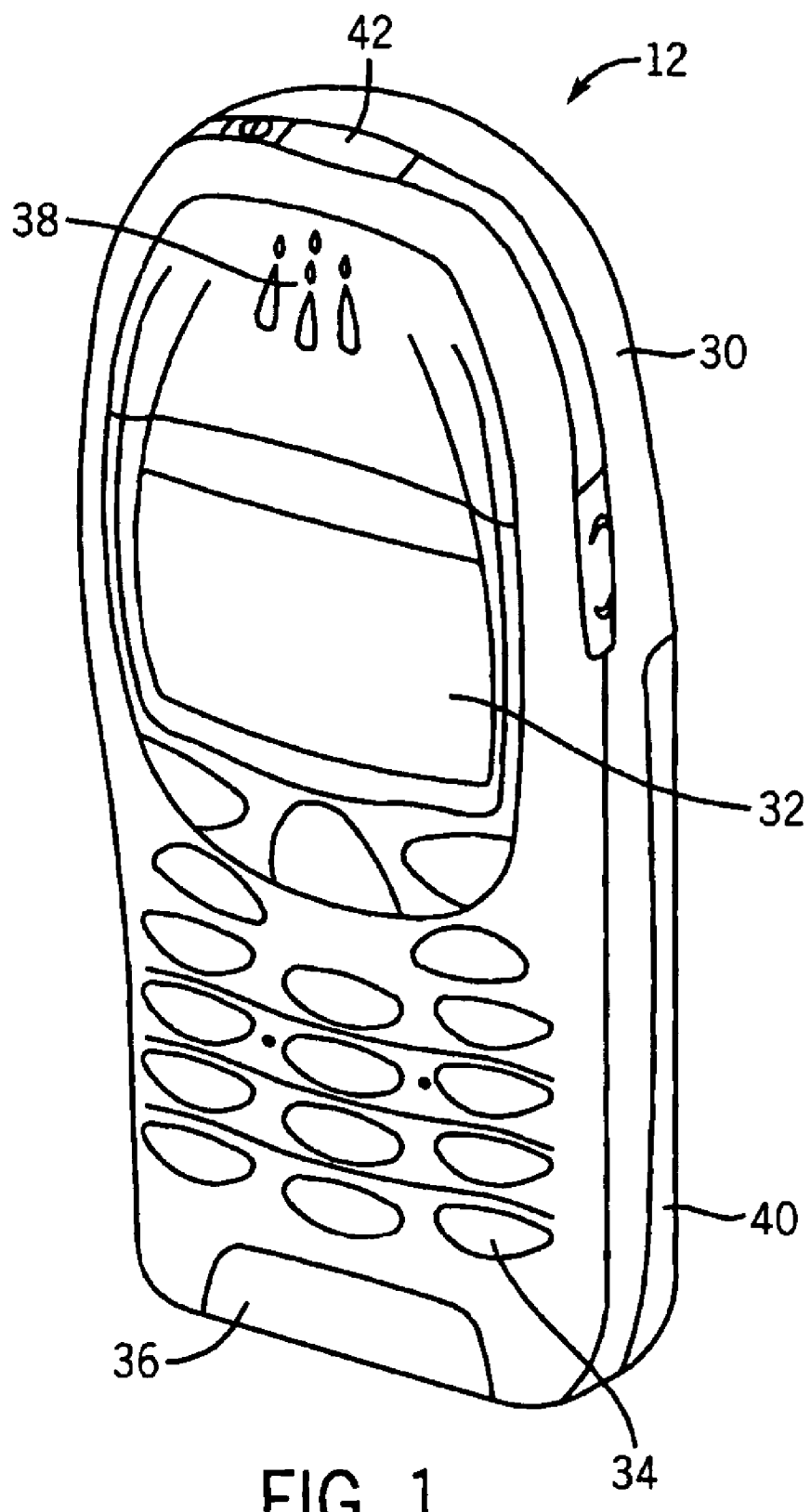
FIG. 1 is a perspective view of a mobile telephone that can be used in the implementation of the present invention.
Figure 2:
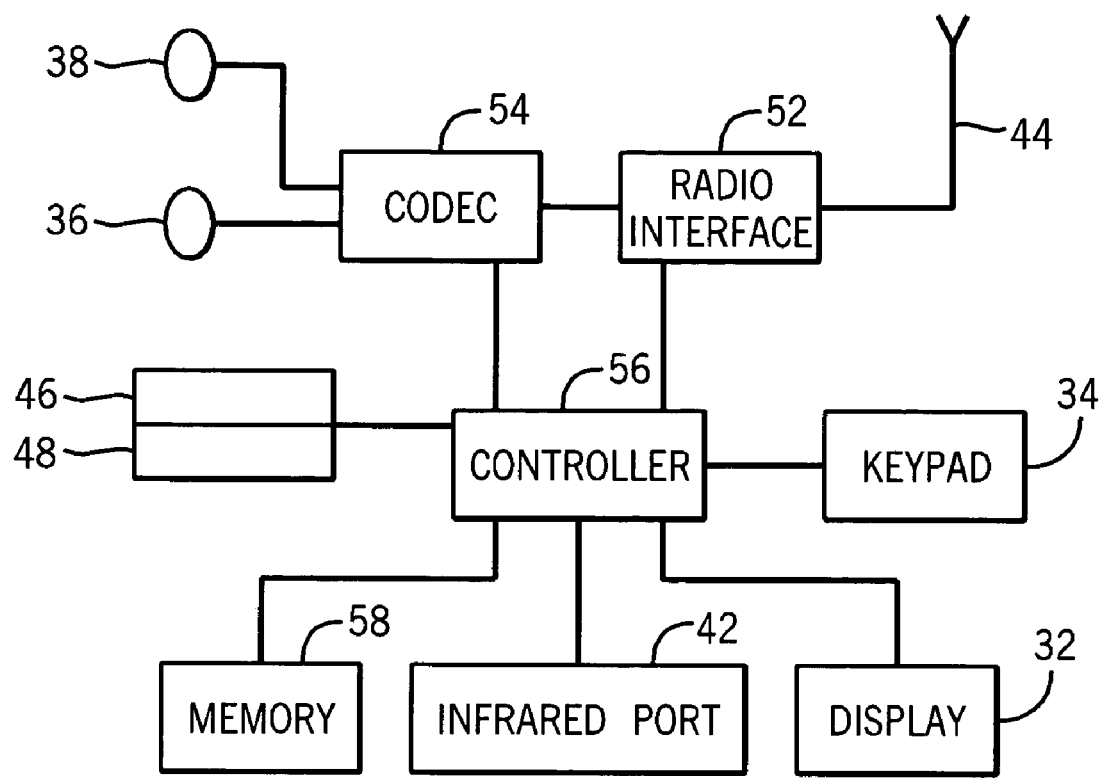
FIG. 2 is a schematic representation of the telephone circuitry of the mobile telephone of FIG. 1.

FIGS. 1 and 2 show one representative mobile telephone 12 within which the present invention may be implemented. It should be understood, however, that the present invention is not intended to be limited to one particular type of mobile telephone 12 or other electronic device. In fact, the present invention can be incorporated into virtually any type of electronic device. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 3:
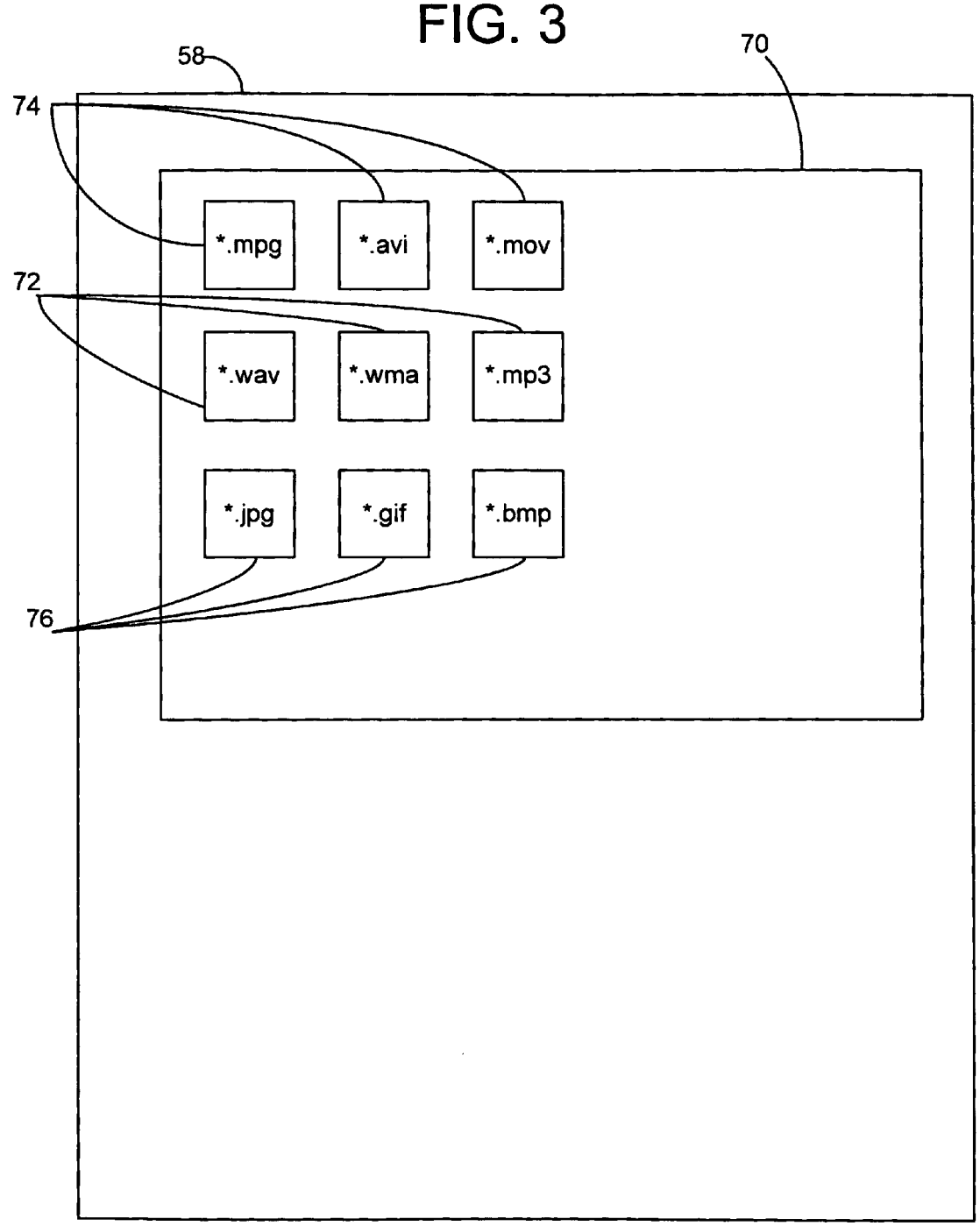
FIG. 3 is representation of a file directory containing a plurality of files which may be used in conjunction with the present invention.

The present invention involves adding functionality to mobile telephones and similar devices by including a system for automatically generating "user theme videos" that can be played in conjunction with a telephone call. FIG. 3 is a graphical representation of a file directory 70 within the memory 58 of the mobile telephone 12. The file directory 70 can include files such as audio files 72, video files 74, and image files 76. These files can be stored in a wide variety of formats, each of which are known in the art. It should be noted that, in terms of the present invention, the files can be stored in multiple directors, as well as potentially being stored remote from the mobile telephone 12 or other electronic device.

The present invention involves a system and method for associating various audio files 72, video files 74, image files 76 and/or other appropriate files with individual contacts on a person's mobile telephone 12. The files that are associated with a particular contact can be merged into one or more multimedia ensembles, which can then be played when a phone call is placed between the user and the particular contact. Individual ensembles can be updated over time as new files become available and can be customizable by the user in various embodiments of the invention.

Figure 4:
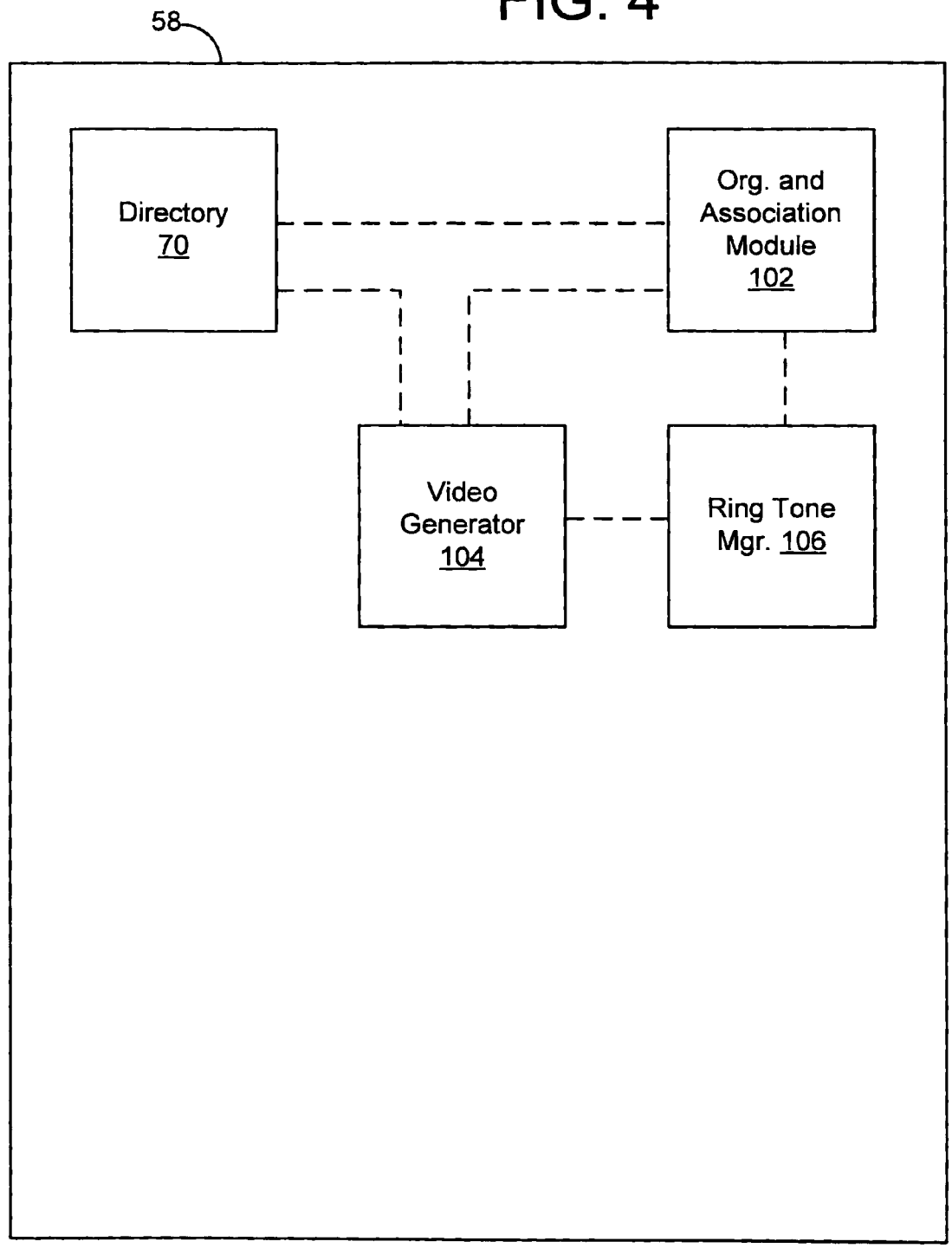
FIG. 4 is a representation of a memory unit in an electronic device including a plurality of applications used in conjunction with one embodiment of the present invention.

FIG. 4 is a graphical representation showing the interaction between various applications that can be used in the implementation of one embodiment of the present invention. In this particular embodiment, all of these applications are stored within the memory 58 of the mobile telephone 12, although it is possible that one or more of the applications be located in a separate memory or remotely and accessed as necessary in alternative embodiments of the invention. As shown in FIG. 4, the memory 58 includes an organization and association module 102, a video generator module 104, and a ring tone manager 106. It should be understood, however, that these individual components may be combined into fewer applications, and individual applications may also be split into smaller units.

The organization and association module 102 is used to associate various files to an entry in the user's contact list. In one embodiment of the invention, the association can occur as a result of user input. For example, the organization and association module can associate files with the contact via a list of all available audio, image and video files, wherein the user selects those files that should be associated with the contact.

In another embodiment of the invention, the organization and association module 102 can include a search facility that searches available files and selects individual files based upon predetermined criteria. For example, the search facility can select all available files that include the name or nickname of the contact in the file name. Alternatively, the user can provide the organization and association module 102 a representative image or video, after which the organization and association module 102 can look for files that include similar content.

The video generator module 104 is used to complete the video generation process. Whenever a new contact is added to the mobile telephone 12, the video generator module 104 can provide the user with the option of selecting a "custom generated video" as the ring tone type. The video generator module 104 can then provide the list of available files to the user, with those files that are selected being associated to the contact by the organization and association module 102. The video generator module 104 can also allow a user to select a particular "style" for the video or series of multimedia items to be generated. Such an option is currently included in Nokia Corporation's "Movie Director" product. The video generator module 104 can then create a video from the selected files, blending items such as still images, audio clips, and video clips according to predefined criteria. The video generator module 104 can create new videos whenever new files are associated with a particular contact. It should be noted that the video generator module 104 can comprise the "Movie Director" product in whole or in part, or it can be completely independent of this product.

The ring tone manager 106 is used to associate one or more ring tones to individual contacts. In the present invention, the ring tones include the videos that are generated by the video generator module 104. The ring tone manager 106, by associating individual ring tones with individual contacts, enables the mobile telephone 12 to play the ring tones whenever that particular contact calls the user, or when the user calls the contact if so desired.

Various sounds can be "mixed" into the ring tones that will be played for individual contacts. For example, a phrase often exclaimed by the contact at issue can be added to the ring tone by the ring tone manager 106. When a user adds a sound effect, the video generator module 104 can take the sound effect and insert it into a suitable location inside the generated video. For example, the video generator module 104 can place the sound effect in suitable insertion points such as beat time instants within music pieces, which can be analyzed from Musical Instrument Digital Interface (MIDI) files with symbolic music analysis methods known in the art, and sampled audio files (e.g., WAV, MP3 and AAC files) with audio signal analysis methods known in the art. Alternatively, the video generator module 104 could read, for example, the beat time instants from pregenerated metadata fields describing the audio content and attached to the audio file, as well as other information such as the music genre, mood, etc. The user can also be provided with the option to choose which audio files 72 should be used as a background audio track, which audio files 72 are to be used as "sound effects," etc.

Figure 5:
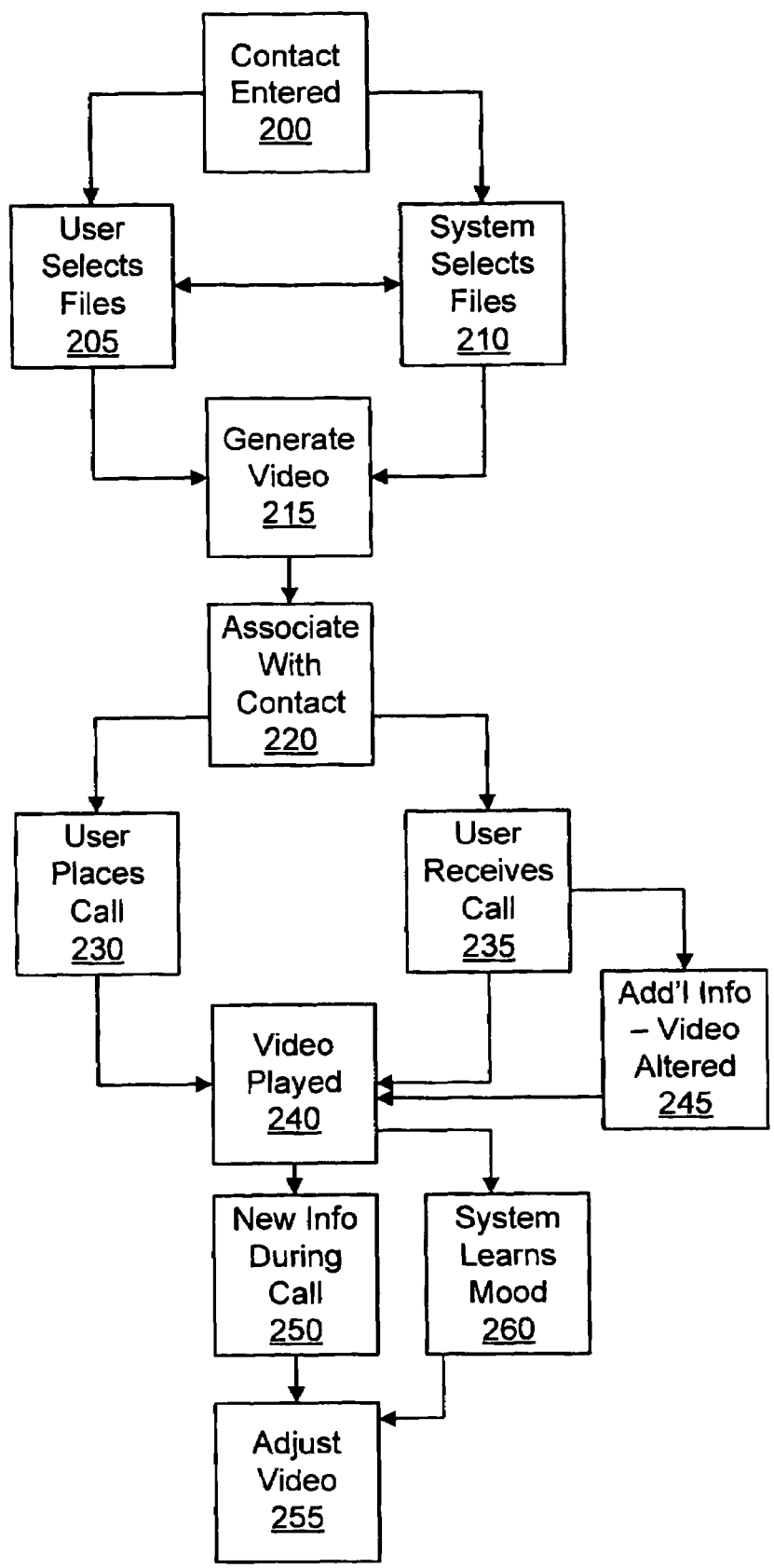
FIG. 5 is a flow charts showing the implementation of various embodiments of the present invention.

FIG. 5 is a flow chart showing the implementation of one embodiment of the present invention. At step 200, a contact is entered into a mobile telephone's contact list by a user. At step 205, the user selects those files that are to be associated with the contact. Alternatively, the organization and association module 102 automatically searches for and selects the files to be associated with the contact at step 210. It is also possible for both of these actions to occur, i.e. a user can add files to an automatically generated list of files or vice versa. At step 215, the video generator module 104 generates at least one video based upon the files that have been associated with the contact. At step 220, the ring tone manager associates the at least one video with the contact. As an optional step, the user is able to add a sound effect to the at least one video.

At step 230, the user places a telephone call to the contact. Alternatively, at step 235, the contact places a telephone call to the user. In both cases, the attempted initiation of a call with the contact results in the user's mobile telephone proceeding to display one of the at least one videos on the mobile telephone's display at step 240. In one embodiment of the invention, this feature can be turned on and off by the user as necessary or desired. As new files are added to the device, the video can be updated and/or regenerated as necessary.

Video generation can also be adapted to include information regarding the caller state in one embodiment of the invention. In this embodiment of the invention, information is transmitted between call participants in addition to the actual audio conversation. For example, when a user receives a call from a contact, the contact can transmit information regarding items such as the contact's mood, the urgency of the call, etc. Based upon this "state" information, the video generator module 104 can alter the generated video accordingly. Such modification of the video is represented at step 245 in FIG. 5.

The following is one use scenario involving the incorporation of caller state information. In a situation where caller A is in a "happy" mode and places a telephone call to caller B, caller A can include an indication of a "happy" mood in the call placement. This mood can be selected from a list of moods, for example. When caller B's phone begins to ring and the ring tone manager 106 associates caller A's call with an associated generated video, the video generator module 104 can alter the video to include features that reflect caller A's mood. For example, the video generator can include brighter colors in the video, can include a smiley face on the mobile telephone's display, or can add cheerful music to the video. Alternatively, if an "angry" mood is selected, the video generator module 104 can include a deep red color with the video, play loud music, or perform other actions that convey an "angry" impression. Additionally, some or all of the individual audio files 72, video files 74, and image files 76 can also include metadata fields including such mood information. This information can be used by the video generator module for creating or altering a video accordingly. The audio files 72, video files 74, image files 76 could also be analyzed by the system to determine such mood information.

Because video generation is computationally intensive, the video generator module 104 can generate a set of candidate videos with different styles (e.g., a "happy" video, an "angry" video, etc.). The most appropriate video can then be played when the associated mood is transmitted by the other call participant, instead of having the system adjust a pregenerated video.

In another embodiment of the present invention, associated videos can continue be played even after a telephone call has begun. For example and in the case of callers A and B, caller B can continue to see images and/or video of caller A during the actual call. In situations where the video also includes music or other audio, the audio can be muted or lowered in volume during the call. By continuing to show images of the other call participant, a rudimentary teleconference capability is created.

In a related embodiment of the invention, the call participants are capable of transmitting information to each other during the actual call. This is represented at step 250. This additional information can be used by the video generator module 104 to adjust the video being played to reflect the additional information. For example and in the case of a call between caller A and caller B, if caller B were to say something that upsets caller A, then caller A could transmit an "angry" mood signal to caller B, causing the video generator module 104 to alter the generated video to reflect this mood. This adjustment of the video is represented at step 255 in FIG. 5. In yet another embodiment, caller B's mobile telephone 12 can analyze the tone in caller A's voice in order to determine caller A's mode, and this information can be provided to the video generator module 104. The determining of mood is represented at step 260 in FIG. 5.

In still another embodiment of the invention, context information in a user's mobile telephone 12 can be transmitted to the other call participant for use in video generation. For example, if a user's mobile telephone 12 is in a "meeting" mode, then the generated video for the other participant can be adjusted to include a small image of a meeting taking place, or the words "meeting in progress" can be scrolled across the display.

In yet another embodiment of the invention, the other participant of a proposed telephone call can transmit specific additional information for use in the generated video. For example, user B could create a user profile that includes an image of user B sleeping to indicate that user B is not answering the phone. In the event that user A later calls user B, but user B does not answer, this image can be transmitted to user A's mobile telephone 12, and the video generator module 104 can then incorporate this image into the generated video that is being displayed on user A's mobile telephone 12.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    associating a contact with selected files from a plurality of files at a device of a user;
    generating a series of multimedia items from the associated files at the device of the user;
    associating the generated series of multimedia items with the contact at the device of the user;
    upon an attempted initiation of a telephone call with the contact, exhibiting the generated series of multimedia items on the device of the user; and
    upon receiving additional information concerning the contact during the telephone call, updating the generated series of multimedia items to reflect the additional information.

2. The method of claim 1, wherein the associating of the contact with the selected files is capable of being performed manually by the user.

3. The method of claim 1, wherein the associating of the contact with the selected files is capable of being performed automatically.

4. The method of claim 1, wherein the plurality of files are selected from the group consisting of audio files, video files, image files and combinations thereof.

5. The method of claim 1, wherein the plurality of files are associated with the contact upon the contact being entered into the device.

6. The method of claim 1, further comprising continuing to exhibit the generated video after the telephone call has been initiated.

7. The method of claim 1, wherein the additional information comprises information reflecting a mood of the contact.

8. The method of claim 1, wherein the generated series of multimedia items comprises a video including items located within the associated files.

9. A computer program product, embodied in a memory, comprising:
   computer code for associating a contact with selected files from a plurality of files at a device of a user;
   computer code for generating a series of multimedia items from the associated files at the device of the user;
   computer code for associating the generated series of multimedia items with the contact at the device of the user;
   computer code for, upon an attempted initiation of a telephone call with the contact, exhibiting the generated series of multimedia items on the device of the user; and
   computer code for, upon receiving additional information concerning the contact during the telephone call, updating the generated series of multimedia items to reflect the additional information.

10. The computer program product of claim 9, wherein the associating of the contact with the selected files is capable of being performed manually by the user.

11. The computer program product of claim 9, wherein the associating of the contact with the selected files is capable of being performed automatically.

12. The computer program product of claim 9, wherein the plurality of files are selected from the group consisting of audio files, video files, image files and combinations thereof.

13. The computer program product of claim 9, wherein the plurality of files are associated with the contact upon the contact being entered into the device.

14. The computer program product of claim 9, further comprising computer code for continuing to exhibit the generated series of multimedia items after the telephone call has been initiated.

15. The computer program product of claim 9, wherein the series of multimedia items comprises a video including items located within the associated files.

16. An electronic device, comprising:
   a processor; and
   a memory unit operatively connected to the processor and including:
      computer code for associating a contact with selected files from a plurality of files at the electronic device;
      computer code for generating a series of multimedia items from the associated files at the electronic device;
      computer code for associating the generated series of multimedia items with the contact at the electronic device;
      computer code for, upon an attempted initiation of a telephone call with the contact, exhibiting the generated series of multimedia items on the electronic device; and
      computer code for, upon receiving additional information concerning the contact during the telephone call, updating the generated series of multimedia items to reflect the additional information.

17. The electronic device of claim 16, wherein the associating of the contact with the selected files is capable of being performed manually by the user.

18. The electronic device of claim 16, wherein the plurality of files are associated with the contact upon the contact being entered into the electronic device.

19. The electronic device of claim 16, wherein the memory unit further comprises computer code for continuing to exhibit the generated series of multimedia items after the telephone call has been initiated.

20. The electronic device of claim 16, wherein the series of multimedia items comprises a video including items located within the associated files.

21. The electronic device of claim 16, wherein the associating of the contact with the selected files is capable of being performed automatically.

22. The electronic device of claim 16, wherein the plurality of files are selected from the group consisting of audio files, video files, image files and combinations thereof.

* * * * *